A. AMOS.
Horse Hay-Rakes.
No. 144,306.  Patented Nov. 4, 1873.
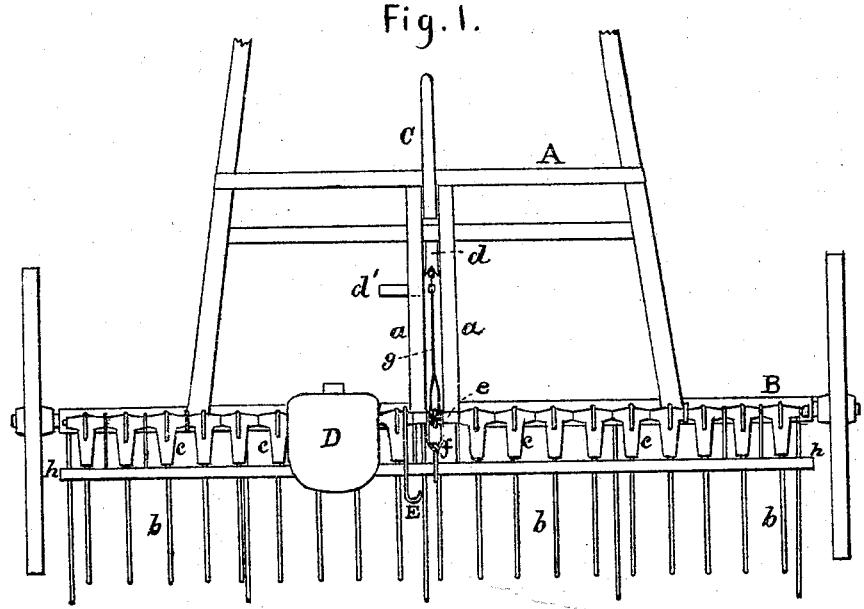
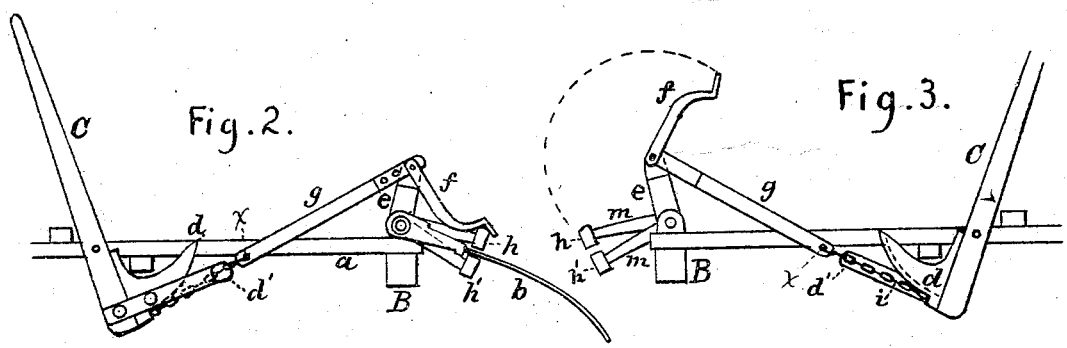
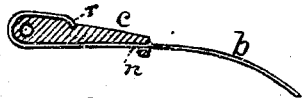
Witnesses:
C. H. Isham
H. A. Daniels
Inventor:
Alexander Amos.
per G. P. Fowler Attorney

UNITED STATES PATENT OFFICE.

ALEXANDER AMOS, OF POTSDAM JUNCTION, NEW YORK.

IMPROVEMENT IN HORSE HAY-RAKES.

Specification forming part of Letters Patent No. 144,306, dated November 4, 1873; application filed September 16, 1873.

*To all whom it may concern:*

Be it known that I, ALEXANDER AMOS, of Potsdam Junction, in the county of St. Lawrence and State of New York, have invented certain new and useful Improvements in Horse Hay-Rakes; and I do hereby declare the following to be a full, clear, and exact description of the invention, such as will enable others skilled in the art to which it pertains to make and use it, reference being had to the accompanying drawings, which form part of this specification.

My invention relates to that class of agricultural implements known as horse hay-rakes; and consists in a peculiar construction and combination of parts, as will be hereinafter more fully explained, and pointed out in the claims.

In the accompanying drawing, which illustrates my invention and forms a part of the specification thereof, Figure 1 is a plan view of my improved rake. Figs. 2 and 3 are side views, illustrating the operating mechanism. Figs. 4, 5, and 6 represent upper, under, and side views of the thimble which holds the tooth. Fig. 7 is a section of thimble with tooth adjusted thereto.

In the drawing referred to, A designates the rake-frame, and B the axle, upon which is supported the rod holding the thimbles $c$, to which are adjusted the teeth $b$. C indicates the lever, pivoted between the bars $a\ a$; D, the driver's seat, and E the hooked rod to hold lever C backward. $d$ indicates a curved projection, rigidly attached to lever C at the lower extremity; and $d'$, a foot-lever, also fastened to the lever C, at the lower end thereof. $e$ designates a clevis-shaped supporter, to the top of which are pivoted the bar-stay or latch $f$ and connecting bar or rod $g$, the latter being connected to curved projection $d$ by the chain $i$. The bars $h\ h'$, between which the teeth pass, are placed one above the other, and held in position by the pieces $m$, which connect with the rake bar or rod, which holds the thimbles. The clevis-shaped supporter $e$ hinges on the rake bar or rod, and its prongs, elbowing and extending, are fastened to the lower or dump bar $h'$, so that a forward or backward movement of it raises or lowers the rake, as desired. Rigidly attached to the lower end of lever C is the projection $d$, of the form shown in the drawing, extending inward, curving upward, and having a groove underneath. It also has the chain $i$ attached at $x$, connecting it with the rod or link $g$, so that when a backward movement of lever C is made, either by the hand or by using the foot-lever, the chain sitting in the groove is pressed downward, thus by a slight movement of the lever drawing the rod $g$, and readily raising the dumping-bar $h'$, and lifting the rake.

The piece termed the bar-stay or latch $f$ is intended to hold the upper bar $h$ down upon the teeth, so that, by means of bars $h\ h'$, they are all held firmly to the same line. This is used when the rake is passing over level ground, and an even movement of the teeth is required; otherwise when the ground is uneven, and the movements of the teeth are to be adapted to the surface. Then the bar-stay is turned off, as shown in Fig. 3, and the teeth, by means of the thimbles $c$, being each allowed an independent movement, turning on the rake bar or rod, readily adapt themselves to the uneven surface.

The thimble $c$ is of the form shown in the drawing, and turns loosely on the main rod or rake-bar. At the rear end it has an eye, $n$, from which, along the center of the under side, extends the groove $o$, passing up and about the fore part of the thimble, and terminating in a slight cavity or depression in the upper side, as shown.

The upper end of the rod forming the tooth $b$ is bent accordingly, to correspond with the groove $o$, and made to terminate in a slight hook, $r$. The tooth is attached to the thimble by passing the lower end through the eye $n$, and drawing it until the upper bent end is sprung into the cavity $r$ of thimble $c$, and the other portion of the tooth from the bent end thereof to the end of the thimble fitting the groove $o$, the position of the tooth when sprung to the thimble being clearly shown in Fig. 7.

By this construction a tooth is readily removed when desired, but held firmly when the rake is in operation.

Having described my invention, I claim—

1. The latch $f$, in combination with connecting rod or bar *g*, supporter *e*, bar *h*, and teeth *b*, constructed and operating substantially as and for the purpose set forth.

2. The thimble *c*, having the continuous groove *o* running along the under side thereof from eye *n*, and terminating above in a cavity or depression, *r*, to receive the tooth and its hooked end, substantially as set forth.

In witness whereof I have hereunto subscribed my name in presence of two witnesses.

ALEXANDER AMOS.

Witnesses:
 DAVID WM. DE FOREST,
 A. McCONNELL.